United States Patent [19]

Stieff

[11] 4,336,451
[45] Jun. 22, 1982

[54] FIELD METHOD FOR DETECTING DEPOSITS CONTAINING URANIUM AND THORIUM

[76] Inventor: Lorin R. Stieff, P.O. Box 263, Kensington, Md. 20795

[21] Appl. No.: 106,424

[22] Filed: Dec. 21, 1979

Related U.S. Application Data

[63] Continuation-in-part of Ser. No. 879,578, Feb. 21, 1978, Pat. No. 4,216,380, and Ser. No. 899,937, Apr. 25, 1978, Pat. No. 4,268,748.

[51] Int. Cl.$^3$ .......................... G01V 5/00; G01T 5/00
[52] U.S. Cl. .................................. 250/255; 250/472; 250/473
[58] Field of Search ................ 250/472, 253, 255, 473

[56] References Cited

U.S. PATENT DOCUMENTS

| | | | |
|---|---|---|---|
| 3,493,751 | 2/1970 | Davies et al. | 250/472 |
| 3,665,194 | 5/1972 | Alter et al. | 250/253 |
| 3,922,555 | 11/1975 | Chapuis et al. | 250/472 |
| 4,066,891 | 1/1978 | Gray | 250/255 |
| 4,081,675 | 3/1978 | Bartz | 250/255 |

OTHER PUBLICATIONS

Frank et al., "A Diffusion Chamber Radon Dosimeter for Use in Mine Environment", Nuc. Instr. and Meth., vol. 109, No. 3, 6-15-73, pp. 537-539.
Frisch, The Nuclear Handbook", Georges Newnes Ltd., London, pp. 4-14, 4-15, 1955.
Takemi et al., "Solid State Track Detector for Several Alpha Emitters of RdTh Daughter Nuclides", Technol. Rep. Osaka Univ., (Japan), vol. 23, No. 1154, Oct. 1973, pp. 727-734.

*Primary Examiner*—Alfred E. Smith
*Assistant Examiner*—Carolyn E. Fields
*Attorney, Agent, or Firm*—James C. Wray

[57] ABSTRACT

Locations of buried deposits are determined by detecting the presence of Pb214, Bi214, Po214, Pb210, Bi210 and Po210 in solutions obtained by chemically leaching these elements from rocks and soil. Polonium from the solution is plated on silver foil planchets. Alpha sensitive films are exposed to the alpha decay of Po214 and Po210 by contacting the films with the planchets. The films, when etched, reveal the damage caused by the passage of the high energy alpha particles. Alpha damage as a function of sample size, volume of solution used, planchet, foil or film area and exposure times measures concentration of Po214 and Po210 in the sample. Anomalus concentrations suggest presence of buried deposits containing uranium. Similar anomalus concentrations of alpha damage from Bi212 and Po212 formed in films exposed to foils or planchets plated from leached solutions containing Pb212, Bi212 and Po212 suggest deposits containing thorium. Plotting normalized alpha damage population (numbers of alpha per gram, per square mm., per hour) and sample locations suggest mineral deposit locations.

13 Claims, 1 Drawing Figure

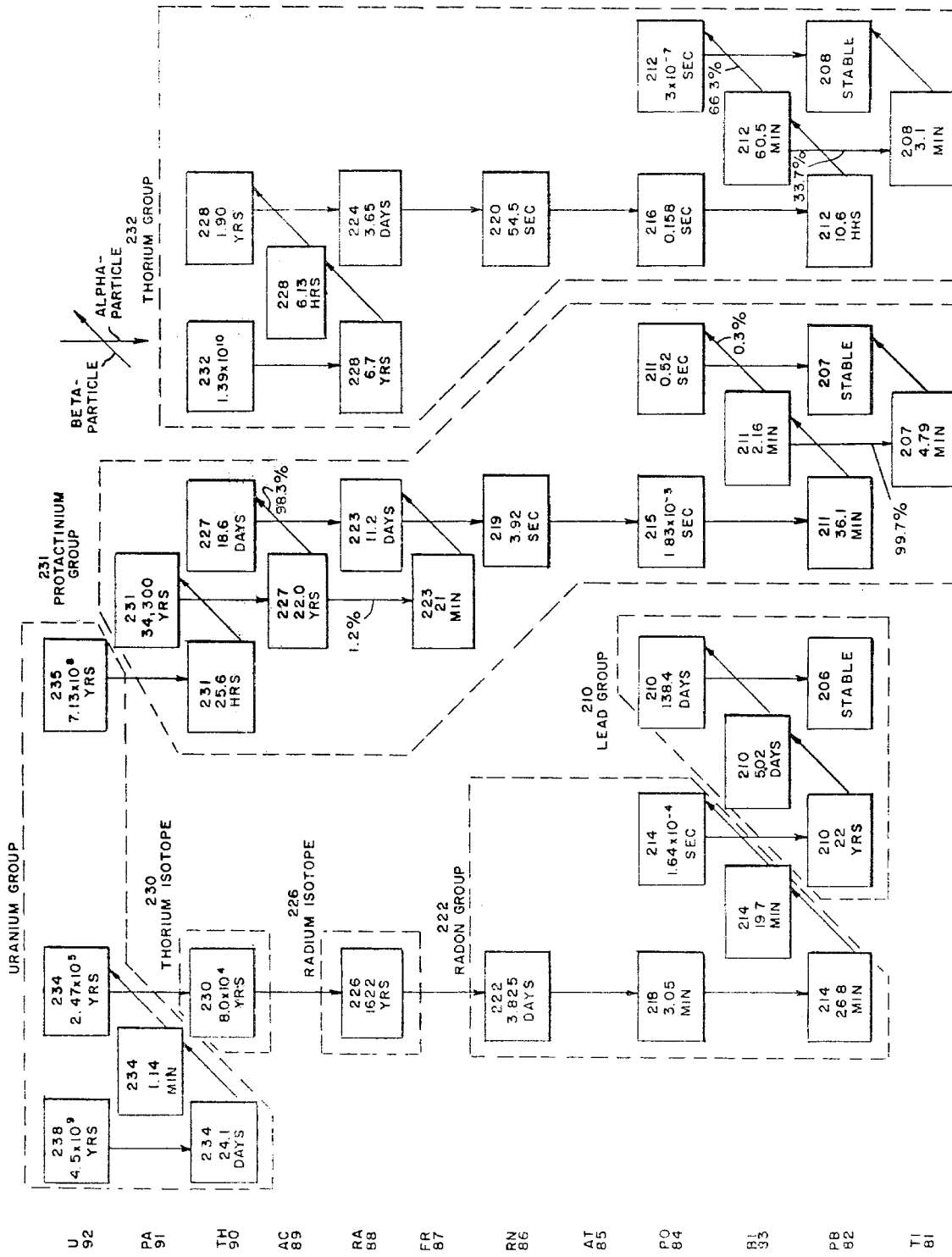

FIELD METHOD FOR DETECTING DEPOSITS CONTAINING URANIUM AND THORIUM

This is a continuation-in-part of applications Ser. No. 879,578, filed Feb. 21, 1978, now U.S. Pat. No. 4,216,380 and Ser. No. 899,937, filed Apr. 25, 1978, now U.S. Pat. No. 4,268,748 by Lorin R. Stieff.

BACKGROUND OF THE INVENTION

This invention relates generally to geological exploration techniques and more particularly has reference to geological testing of rock and soil samples to determine the location of buried deposits containing uranium and thorium.

DESCRIPTION OF THE PRIOR ART

Pertinent United States and foreign patents are found in Class 250, Subclasses 253, 255, and 364; Class 23, Subclasses 230EP and 230R and Class 73 of the Official Classifications of Patents in the United States Patent and Trademark Office.

Examples of pertinent patents are U.S. Pat. Nos:
3,665,194
3,825,751
3,968,371
3,988,587
4,055,762
4,064,436

U.S. Pat. No. 3,665,194 shows a radon dosimetry system. A sheet of track registration material having the property of forming damage tracks along paths traversed by alpha particles is exposed in an area to be monitored. Alpha particle tracks are formed when the material becomes irradiated. The tracks are counted and serve as a measure of the amount of radon and uranium daughter products present.

U.S. Pat. No. 4,055,762 shows a radon daughter dosimeter. The device is designed to detect radon gas alpha daughters in ambient air.

U.S. Pat. No. 3,825,751 shows a method and apparatus for detecting radioactive substances by measuring emitted gamma radiation. The process includes aerial radioactivity surveying.

DESCRIPTION OF THE INVENTION

The present invention overcomes the problems which exist in the prior art devices.

The present invention is based on evidence that daughter products of uranium in the U238 decay chain migrate and fractionate in the process of forming low concentration halos surrounding the deposit. The present invention detects the presence of Pb214, Bi214, Pb210 and Bi210 precursors using films which record alpha damage from alpha decay of Po214 and Po210. In the field a solution containing Pb-Bi-Po is obtained from soil or rock samples. The Po (and Pb plus Bi) in the solution is deposited on a silver foil or planchet. The foil or planchet is placed in contact with an alpha sensitive film or, if necessary, the energy of the alpha particle is reduced by interposing a very thin absorber. The film is etched to reveal the damage produced by the alpha particles, and the damage features are observed upon microscopic examination. The concentration of alpha damage features as a function of sample size, volume of solution used, film area and exposure time is a measure of the presence of daughter products such as radium and radon surrounding a buried deposit containing uranium or thorium. Deposits containing thorium are detected by looking at films contacted by planchets plated in solutions containing Pb212, Bi212 and Po212. Characteristic alpha particle decays of Bi212 and Po212 reveal concentrations of thorium.

A chart of decay schemes of uranium and thorium is shown in the drawing.

The characteristics of the alpha damage in exposed and etched films are dependent on the energy of alpha particles and half lives of the daughter products. By controlled delays in exposing the films to freshly prepared foils and planchets and by selective, chemical methods of processing the sample, a basis is provided for distinguishing between specific daughter products such as Po210 from uranium and Po212 from thorium.

Locations of buried uranium deposits are determined by detecting the presence of Pb214, Bi214, Po214, Pb210, Bi210 and Po210 in solutions obtained by chemically leaching these elements from rocks and soil. Polonium from the solution is plated on silver foil planchets. Alpha sensitive films are exposed to the alpha decay of Po214 and Po210 by contacting the films with the planchets. The films, when etched, reveal the damage caused by the passage of the high energy alpha particles. Alpha damage as a function of sample size, volume of solution used, planchet or foil area and exposure times measures concentration of Po214 and Po210 in the sample. Anomolus concentrations suggest presence of buried deposits containing uranium. Similar anomolus concentrations of alpha damage from Bi212 and Po212 formed in films exposed to foils or planchets plated from leached solutions containing Pb212, Bi212 and Po212 suggest deposits containing thorium. Plotting normalized alpha damage population (numbers of alpha per gram, per square mm., per hour) and sample locations suggest mineral deposit locations.

The invention provides an improved field method for detecting deposits containing uranium or thorium and provides a radioactive mineral deposit detecting technique which detects the presence of daughter products below the surface of the ground.

The invention provides a field method for detecting deposits of material having characteristic matter surrounding the deposit including collecting samples from beneath the surface of the ground in the vicinity of a deposit, studying the samples for characteristic matter, and calculating the location of the deposit based on the characteristic matter in the samples.

The preferred field method of the present invention detects location of deposits containing uranium or thorium. Preferably the invention provides for distinguishing between uranium or thorium containing deposits. The invention detects characteristic radioactive daughter products near the deposits by collecting subsurface samples from vicinities of possible deposits and by studying samples for characteristic radioactive daughter product matter. Typically, the studying procedure of the present invention includes the steps of contacting alpha particle sensitive films with the radioactive matter from the samples, etching the films, and studying the etched films for alpha particle damage. Presence of deposits containing uranium or thorium is detected based on the alpha particle damage in the films caused by characteristic radioactive daughter product matter in the samples. Plotting sample locations and alpha particle damage populations, one determines location of deposits containing uranium or thorium.

Preferably the samples are taken of rock or soil. Typically, the characteristic radioactive daughter products are distributed in differentiated zones surrounding the deposit, and the samples are collected from the zones. Preferably the characteristic daughter product matter is radioactive matter having a half-life of less than a year.

In the preferred method, the presence of the deposit is calculated by determining the population of alpha damage on the etched film as a function of sample size, volume of solution used, film area and exposure time.

In the preferred method, the process of studying the samples includes contacting the film with silver foils or planchets on which alpha active Po has been deposited.

In the preferred method, the contacting comprises directly placing the silver foils or planchets on the film. The contacting may include interposing a thin plastic absorber sheet between the planchets and the film.

Typically in the present invention the process of studying the samples for characteristic matter includes preferentially leaching the samples to obtain a solution including specific radioactive daughter products which have been deposited within the last few hundred years.

In the preferred form of the invention the radioactive daughter products are a mixture of Pb214, Bi214, Po214, Pb210 and Po210 detected by the alpha decay of Po214 and Po210 respectively in samples collected in the vicinity of a deposit containing U238. Studying of the samples includes chemically extracting Pb, Bi and Po in a solution from the samples, exposing alpha sensitive films to alpha particle activity of Po from the solution, etching the films, and studying the etched films for alpha damage. Radioactive daughter product Pb212 detected by the alpha decay of Po212 and Bi212 suggests a deposit containing thorium 232.

DETAILED DESCRIPTION OF THE INVENTION

Generally, the present invention is a field method for exploring for mineral deposits, in particular deposits containing daughter products in the uranium and thorium decay chain which migrate away from the ore deposit and are fractionated in the process of forming very low concentration halos surrounding the deposit.

In the case of U238, the daughter products Th234, U234, Th230, Ra226 and Pb210, because of their relatively long half lives, different geochemical behavior and, in the case of Rn222, its physical behavior as a noble gas, participate in migration, transport and fraction processes. The present invention determines the location of buried uranium deposits by detecting the presence of certain radon daughter products and indirectly the presence of radon and the other daughter products above radon in the U238 decay chain. More particularly, the present techniques detect the presence of Pb214 and Bi214, as well as Pb210 and Bi210 by alpha activity of Po214 and Po210, respectively.

Subsurface soil or rock samples are collected in the vicinity of a suspected U238 deposit. Since most radon and other daughter products migrating away from a U238 deposit do not reach the surface but rather decay in the ground, it is important that subsurface samples be collected. Pb-Bi-Po solutions are obtained from the samples using acid leaches or other standard geochemical prospecting techniques for Pb and Bi, for example, either a weak HN03 or ammonium citrate leach of the sample followed by dithizone extraction and, if necessary, back extraction of the dithizone with 0.02 N HN03.

The solution containing the Pb-Bi-Po may be deposited on a planchet or plated on a silver foil. The planchet is immediately exposed to an alpha sensitive film for a short period of time to record the decay of Po214. Later, the planchet is exposed to a film for Po210 measurement. Po may be plated directly on the silver foils for contacting the films, in one example. The alpha activity of the planchets may also be established using electronic instrumentation.

For purposes of the invention, planchets or silver foils may be used interchangeably. The desired isotopes may be transferred to the planchets or foils by deposition, autoplating or electroplating. The solutions may be placed directly on the films and may be evaporated thereon.

Alpha particles from polonium 214 and 210 on the planchets impinge on the films and damage the films. The films, after etching, are examined microscopically for evidence of alpha damage. Po214 is used as the short term integrator of the movement of Rn222 and other daughter products through the soil. The Po210 decay is used as the long term integrator of Rn222 and other daughter products and is an indication of the presence of the immediate precursor pair Pb210-Bi210.

Population of alpha tracks as a function of sample size, volume of solution used, foil, planchet or film area and exposure time is a measure of the concentration of daughter products in the sample. An anamolous population of alpha tracks would suggest presence of halos possibly containing very small concentrations of uranium or thorium daughter products and may be evidence for the presence and location of deposits containing uranium or thorium. Plotting the sample locations and normalized alpha track populations provides a means of identifying areas in which deposits may be found.

When looking for deposits containing thorium, alpha tracks characteristic of Bi212 and Po212 can be used.

In a preferred example of the invention, splits of crushed and sieved soil and rock samples ranging in size from one to ten grams are taken from larger samples collected from the area which is being surveyed. The samples are then leached with approximately 10 ml. hot, concentrated hydrochloric acid. The resulting solution is centrifuged and quantitatively transferred to a 50 ml. volumetric flask. Distilled water is added to adjust the volume to 50 m. 10 m. of the solution is transferred to a 100 ml. beaker. The volume is adjusted to 50 m., the ph is adjusted to 2.0 with ammonium hydroxide. 0.5 grams of sodium citrate and 1.0 grams hydroxylamine hydrochloride and 10 mg. of a bismuth carrier are added to the beaker following the procedure described by W. W. Flynn in Anal. Chim. Acta, Vol. 43, 1968, pp. 221–227.

One side of a $\frac{3}{4}$ inch diameter silver foil is exposed to solution at approximately 85° C. for about four hours. The silver foil is removed, washed with distilled water and is placed on a 7.5 micron cellulose nitrate film (supplied by Eastman Kodak).

The foil contacts the film for about 24 hours. The film is marked about the foil. The foil is removed. The film is etched in 2.5 N sodium hydroxide solution for about 70 min. at 50 c. The film is rinsed and dried. A microscopic examination at 100 to 450 power reveals alpha damage.

The amount of damage is in direct relation to the exposure time and polonium concentration in the sample.

When analyzing for the very short lived Pb214-Bi214-Po214 decay chain, it is important that the measurement be made immediately following the deposition of the Pb214 on the foil or planchet. In the example of the Pb214-Po214 chain the foil or planchet, with the appropriate absorber, if necessary, must be rapidly contacted with a film. After approximately four hours all of the Pb214 will have decayed to Pb210. Then the planchet may be transferred to a second film for the measurement of the long term radon integrater, Po210. This exposure period will normally last from 12 to 24 hours.

When analyzing for the relatively short lived Pb212-Bi212-Po212 chain at the end of the thorium decay chain, it is necessary to first let the Po214-Bi214-Po214 chain completely decay to Pb210. As noted above, this will occur within approximately four hours after the foil or planchet has been prepared. Following the elapse of this interval, the foil or planchet with appropriate absorber, if necessary, is contacted with a film. Following an exposure of 12 to 24 hours and etching of the film, the alpha damage features observed will be a direct measure of the Pb212 originally deposited on the film or planchet. The absence of any alpha damage featured on a second film contacted with the same foil or planchet following an interval of approximately five days will confirm that essentially all of the 10.6 hr. half-live Pb212 has decayed to its stable end product Pb208.

While the invention has been described with reference to a specific embodiment, the exact nature and scope of the invention is defined in the following claims.

I claim:

1. A field method for detecting location of a deposit containing uranium or thorium and for distinguishing between uranium or thorium containing deposits having characteristic radioactive daughter products near the deposit comprising collecting subsurface samples from a vicinity of the deposit, studying the samples for characteristic radioactive daughter product matter, comprising the steps of contacting alpha particle sensitive films with the radioactive matter, etching the films, studying the etched films for alpha particle damage, detecting presence of the deposit containing uranium or thorium based on the alpha particle damage in the films caused by characteristic radioactive daughter product matter in the samples, plotting sample locations and alpha particle damage populations, and determining location of deposits containing uranium or thorium from the plotting, wherein the process of studying the samples comprises depositing a radioactive daughter product from a solution on a planchet or silver foil and exposing the films with the planchet or silver foil on which the radioactive daughter product has been deposited, and wherein the exposing comprises directly placing the planchet or foil on the films.

2. The method of claim 1 wherein the samples are rock or soil.

3. The method of claim 1 wherein the characteristic radioactive daughter product is distributed in differentiated zones surrounding the deposit, and the samples are collected from the zones.

4. The method of claim 1 wherein the characteristic daughter product matter is radioactive matter having a half-life of less than a year.

5. The method of claim 1 wherein the process of detecting the presence of the deposit comprises, determining the population of alpha damage on the etched film as a function of sample size, volume of solution used, film area and exposure time.

6. The method of claim 5 wherein the process of studying the samples comprises directly contacting the film with silver foils or planchets on which alpha active Po has been deposited.

7. The method of claim 1 wherein the process of studying the samples for characteristic matter comprises preferentially leaching the samples to obtain a solution including specific radioactive daughter products which have been deposited within the last few hundred years.

8. The method of claim 1 wherein the radioactive daughter products are a mixture of Pb214, Bi214, Po214, Pb210 Bi210 and Po210 detected by alpha decay of Po214 and Po210 respectively in samples collected in the vicinity of a deposit containing U238, and wherein studying the samples comprises chemically extracting Pb, Bi and Po in a solution from the samples, exposing alpha sensitive films to alpha particle activity of Po from the solution, etching the films, and studying the etched films for alpha damage.

9. The method of claim 1 wherein the radioactive daughter product Pb212 is detected by the alpha decay of Po212 and Bi212 suggesting a deposit containing thorium 232.

10. The method of claim 1 wherein the process of studying the samples comprises directly contacting the film with planchets on which alpha active Po has been deposited.

11. The method of claim 1 wherein the process of studying the samples for characteristic matter comprises selectively leaching the samples to obtain a solution including specific radioactive daughter products.

12. A field method for detecting location of a deposit containing uranium or thorium and for distinguishing between uranium or thorium containing deposits having characteristic radioactive daughter products near the deposit comprising collecting subsurface samples from a vicinity of the deposit, studying the samples for characteristic radioactive daughter product matter, comprising the steps of contacting alpha particle sensitive films with the radioactive matter, etching the films, studying the etched films for alpha particle damage, detecting presence of the deposit containing uranium or thorium based on the alpha particle damage in the films caused by characteristic radioactive daughter product matter in the samples, plotting sample locations and alpha particle damage populations, and determining location of deposits containing uranium or thorium from the plotting, wherein the process of studying the samples comprises contacting the films with silver foils or planchets on which alpha active Po has been deposited, and wherein the contacting comprises directly placing the planchets or foils on the films.

13. A field method for detecting location of a deposit containing thorium and for distinguishing between uranium or thorium containing deposits having characteristic radioactive daughter products near the deposit comprising collecting subsurface samples from a vicinity of the deposit, studying the samples for characteristic radioactive daughter product matter, comprising the steps of depositing Pb, Po, and Po from the samples on foils or planchets, contacting alpha particle sensitive films with the foils or planchets, etching the films, studying the etched films for alpha particle damage, detecting the presence of the deposit containing thorium based on the alpha particle damage in the films caused by characteristic radioactive daughter product matter in the samples, plotting sample locations and alpha particle damage populations, and determining location of deposits containing thorium from the plotting, wherein the radioactive daughter product Pb212 is detected by the alpha decay of Po212 and Bi212 suggesting a deposit containing thorium 232 and wherein after about a four hour interval following the deposition of Pb, Po, and Bi, a first film is contacted with a foil or planchet and exposed for about 12 to 24 hours and subsequently a second film is exposed to the same foil or planchet for a period sufficient to allow decay of essentially all the Pb212 to Pb208.

* * * * *